United States Patent [19]

Creutz, deceased et al.

[11] 4,169,771

[45] Oct. 2, 1979

[54] DUCTILE BRIGHT ZINC ELECTROPLATING BATH AND PROCESS AND ADDITIVE THEREFOR

[75] Inventors: Hans-Gerhard Creutz, deceased, late of Yale, Mich., by Katharina A. Creutz, administratrix; Roy W. Herr, Troy; Sylvia Martin, Detroit, both of Mich.

[73] Assignee: Oxy Metal Industries Corporation, Warren, Mich.

[21] Appl. No.: 897,979

[22] Filed: Apr. 20, 1978

[51] Int. Cl.$^2$ ............... C08G 59/02; C08G 59/14; C25D 3/22; C25D 3/24
[52] U.S. Cl. .................. 204/55 R; 204/55 Y; 528/407
[58] Field of Search ........... 528/407; 204/43 Z, 55 R, 204/55 Y, DIG. 2

[56] References Cited

U.S. PATENT DOCUMENTS

| | | | |
|---|---|---|---|
| 3,853,718 | 12/1974 | Creutz | 204/55 R |
| 3,954,575 | 5/1976 | Yanagida et al. | 204/55 R |
| 3,972,789 | 8/1976 | Eppensteiner et al. | 204/55 Y |
| 3,974,045 | 8/1976 | Takahashi et al. | 204/55 R |
| 4,045,306 | 8/1977 | Senge et al. | 204/55 R |

*Primary Examiner*—G. L. Kaplan
*Attorney, Agent, or Firm*—Richard P. Mueller; Arthur E. Kluegel

[57] ABSTRACT

An improved solution and process for depositing bright zinc coatings employing an aqueous solution containing zinc ions and an effective amount of a brightening agent comprising a bath soluble cationic alkylated condensation polymer obtained by alkylating a condensation polymer of an epihalohydrin and a heterocyclic compound containing at least 2 nitrogen atoms with a trialkyl ammonio-halo-alkyl halide salt.

7 Claims, No Drawings

DUCTILE BRIGHT ZINC ELECTROPLATING BATH AND PROCESS AND ADDITIVE THEREFOR

BACKGROUND OF THE INVENTION

It is of course known to employ zinc electroplating solutions for purposes of depositing corrosion resistant and decorative plating deposits upon a variety of substrates as exemplified by iron, steel and the like. In order to enhance the brightness of the plating deposit, a variety of additive agents have heretofore been proposed or used. Typical of such brightening and/or additive agents are those disclosed in U.S. Pat. Nos. 3,853,718; 3,974,045 and 4,045,306. It is conventional commercial practice to employ a plurality of such brightening agents in a zinc plating bath in order to attain the desired characteristics of the deposit.

A continuing problem associated with zinc plating baths of the types heretofore known is the inability to produce consistently fully bright zinc deposits over broad operating pH ranges and over a broad range of current densities. Additionally, the deposition of a zinc plate of high ductility has also heretofore been difficult to attain.

The zinc plating bath and process of the present invention overcomes many of the problems and disadvantages associated with prior art solutions and techniques by providing a zinc plating bath featuring a brightening agent which enhances the flexibility and versatility of the bath and producing excellent fully bright zinc deposits over broad pH and current density ranges, while at the same time producing a zinc deposit which has excellent ductility characteristics.

SUMMARY OF THE INVENTION

The benefits and advantages of the present invention are achieved by employing an effective amount of the brightening agent of the present invention in a variety of zinc electroplating baths including alkaline cyanide-free zinc, cyanide zinc, and acid zinc including the sulfate, chloride and fluoborate types, whereby exceptionally ductile plating deposits of full brightness are attained over a broad operating pH and current density range. The brightening agent comprises an aqueous bath soluble cationic alkylated condensation polymer obtained by alkylating a condensation polymer of an epihalohydrin and a heterocyclic compound containing at least 2 nitrogen atoms with a trialkyl amoniohaloalkyl halide salt such as 3-halo-2-hydroxy propyl trialkyl ammonium halide and 2-halo-ethyl-trialkyl ammonium halide, of which the chlorine halide derivatives are preferred. The brightening agent of the present invention is advantageously employed either alone or in combination with one or more other brightening agents of the types well known in the art, including aromatic aldehydes, pyridine quaternaries, polyvinyl alcohol, polyethers, polyglycidol, ethoxylated naphthols, aromatic carbonyl compounds, and the like.

Additional benefits and advantages of the present invention will become apparent upon a reading of the description of the preferred embodiments taken in conjunction with the specific examples provided.

DESCRIPTION OF THE PREFERRED EMBODIMENTS

The improved brightening agent and the zinc plating baths prepared incorporating the same comprises a bath soluble cationic alkylated condensation polymer obtained by alkylating a condensation polymer of an epihalohydrin and a 5 or 6 membered heterocyclic compound containing at least 2 nitrogen atoms in the ring with a controlled amount of a trialkyl ammonio-haloalkyl halide compound. The heterocyclic compound may comprise a 5 or 6 membered heterocyclic compound containing at least 2 nitrogen atoms in the ring and may additionally be substituted by amino, alkyl groups containing from 1 to 4 carbon atoms, carboxy or hydroxy or carbonyl groups, such as acetyl groups. The substituents could also comprise a condensed aromatic ring system as in benzotriazole. Typical of the heterocyclic compounds which may be employed in accordance with the foregoing definition are those set forth in Table I.

Table I

| | |
|---|---|
| imidazole | 1,2,3 - triazole |
| 2 - methylimidazole | tetrazole |
| 2,4 - dimethylimidazole | 1,3,5-triazine |
| 4-hydroxy-2-aminoimidazole | benzotriazole |
| 5-ethyl-4-hydroxyimidazole | tolyltriazole |
| pyrazole | |

The specific heterocyclic compound or mixture of heterocyclic compounds is reacted with an epihalohydrin compound or mixtures thereof in a mol ratio of from about 0.5 up to about 1 mol epihalohydrin per mol of heterocyclic compound. While epibromohydrin and epi-iodohydrin can be employed, epichlorohydrin constitutes at present the preferred material. In accordance with a preferred embodiment of the present invention, the heterocyclic compound is utilized in a slight molar excess, whereby the resultant polymer has terminal heterocyclic groups which facilitate the subsequent alkylation reaction. Polymers comprising about 1 mol of heterocyclic compound and about 0.9 mols epihalohydrin are particularly preferred. The polymerization reaction is carried out in an aqueous medium at elevated temperatures up to about the boiling point of the solution with temperatures of from about 40° C. up to about 95° C. being suitable. Polymerization reaction times of from about one hour up to about 15 hours are usually adequate to produce the desired degree of polymerization.

To the resultant solution containing the condensation polymer, an alkylating agent is added in an amount of about 0.1 up to about 0.5 mols per mol of heterocyclic compound. Particularly satisfactory results are obtained when the alkylating agent is employed in amounts of about 0.2 mols up to about 0.3 mols per mol heterocyclic compound. The alkylating agent or quaternizing agent comprises a trialkyl ammonio-halo-alkyl halide compound having a structural formula as follows:

Wherein:
R = $-(CH_2-CH_2)-$ or $(CH_2CHOHCH_2)$;
R' = an alkyl group of 1 to 4 carbons; and
X = Cl, Br or I.

Alkylating agents in which R comprises an ethyl group can generically be described as 2-halo-ethyl trialkyl ammonium halide while compounds in which R is 2-hydroxy propyl can be generically defined as 3-halo-2-hydroxy-propyl-trialkyl ammonium halide. Of the foregoing, compounds in which the halogen is chlorine are preferred. A particularly satisfactory compound is 3-chloro-2-hydroxy-propyl trimethyl ammonium chloride.

The alkylation of the condensation polymer is performed by adding the alkylating agent to the aqueous reaction solution containing the polymer and continuing heating at the prescribed temperature for an additional period of time to complete alkylation. Alkylation reaction periods of from about one half hour up to about three hours are usually satisfactory.

In accordance with a preferred embodiment of the present invention, appropriate amounts of other brightening agents of the types well known in the art including aromatic aldehydes, pyridine quaternaries, polyvinyl alcohol, polyethers, polyglycidol, ethoxylated naphthols, aromatic carbonyl compounds and the like may be admixed in appropriate amounts with the alkylated polymer to provide an optimum mixture of brighteners.

Pursuing the process features of the present invention, the cationic alkylated polymer is added in controlled amounts to any one of a variety of zinc plating baths, either alone or in combination with additional conventional brighteners, thereby providing improved brightening effects in electroplating solutions including alkaline cyanide-free zinc, cyanide zinc, and acid zinc including the sulfate, chloride or fluoborate types. The magnitude of brightness of the zinc deposit will vary somewhat depending upon the specific type of zinc plating system employed. Preferably, the cationic alkylated polymer is employed in concentrations of from about 0.001 g/l up to about 25.0 g/l.

In order to further illustrate the present invention, the following specific examples are provided. It will be understood that the examples are provided for illustrative purposes and are not intended to be limiting of the scope of the present invention as herein described and as set forth in the subjoined claims.

EXAMPLE 1

A cationic alkylated polymer brightening agent is prepared by forming an aqueous solution containing 0.9 mols imidazole and 0.91 mols epichlorohydrin which is heated to a temperature of about 95° C. for a period of 15 hours. Thereafter, 0.45 mols of 3-chloro-2-hydroxypropyl-trimethyl ammonium chloride is added and heating of the reaction mixture is continued for an additional period of one hour to complete the alkylation reaction. The resultant reaction medium after cooling is diluted with water to a concentration of about 385 g/l prior to use.

EXAMPLE 2

A cationic alkylated polymer brightener is prepared in accordance with the conditions and sequence of steps as described in Example 1 employing the following reactants:

| Reactant | Mols |
|---|---|
| Imidazole | 1.0 |
| Epichlorohydrin | 0.9 |
| 3-chloro-2-hydroxy propyl trimethyl ammonium chloride | 0.2 |

EXAMPLE 3

A cationic alkylated polymer brightener is prepared in a manner similar to that described in Example 1 employing the following reactants:

| Reactant | Mols |
|---|---|
| Pyrazole | 1.0 |
| Epichlorohydrin | 0.9 |
| 3-chloro-2-hydroxypropyl trimethyl ammonium chloride | 0.2 |

EXAMPLE 4

A cationic alkylated polymer brightener is prepared in accordance with the procedure described in Example 1 employing the following reactants:

| Reactant | Mols |
|---|---|
| Triazole | 1.0 |
| Epichlorohydrin | 0.9 |
| 3-chloro-2-hydroxypropyl trimethyl ammonium chloride | 0.2 |

EXAMPLE 5

An aqueous zinc electroplating solution is prepared incorporating the ingredients at the following concentrations:

| Ingredient | Concentration |
|---|---|
| Zn | 7.5 g/l |
| NaOH | 98 g/l |
| Brightener (Example I) | 1 g/l |

The brightener employed corresponded to the cationic alkylated polymer was prepared in accordance with Example I. The plating bath is operated at a pH of about 14 at a temperature of about 24° C. in a standard Hull cell at two amperes. The test panel was observed as having a ductile and bright zinc deposit at current densities between 10 and 80 ASF.

EXAMPLE 6

A zinc plating solution is prepared incorporating the constituents in the concentrations as set forth below:

| Ingredient | Concentration |
|---|---|
| Zn (from Zn SO$_4$) | 75 g/l |
| H$_3$BO$_3$ | 22.5 g/l |
| Brightener (Example I) | 20 mg/l |

The solution has a pH of 4.5 and a test panel is plated at 60 ASF. The resultant plated panel was found to have a fully bright and ductile zinc deposit but was observed to have poor recessed coverage. The latter characteristic is typical of acid zinc sulfate solutions.

EXAMPLE 7

An aqueous zinc electroplating solution is prepared incorporating the ingredients in the concentrations as set forth below:

| Ingredient | Concentration |
| --- | --- |
| Zn | 18 g/l |
| NaOH | 75 g/l |
| NaCN | 45 g/l |
| Brightener (Example I) | 50 mg/l |

A steel test panel is plated in a Hull cell at two amperes and at a temperature of 26° C. The test panel is bright between 1–60 ASF.

EXAMPLE 8

An acid zinc chloride plating solution is prepared incorporating the ingredients in the concentrations as set forth below:

| Ingredient | Concentration |
| --- | --- |
| Zn (from Zn Cl$_2$) | 35 g/l |
| Cl (from KCl or NH$_4$Cl) | 165 g/l |
| Brightener (Example I) | 0.75 g/l |

A test panel is plated in the foregoing solution at a pH of 5.5 and at a current density of 40 ASF and at a temperature of 21° C. The test panel has a bright to semi-bright appearance.

EXAMPLE 9

An alkaline, cyanide-free zinc plating solution is prepared incorporating the following ingredients:

| Ingredient | Concentration |
| --- | --- |
| Zn (from Zn O) | 8.0 g/l |
| NaOH | 85.0 g/l |
| Brightener (Example 4) | 2.0 g/l |

The solution was plated at a temperature of 22° C. in a Hull cell at 2 amperes. The deposit is bright between 5–75 ASF and is very ductile.

What is claimed is:

1. A brightener for aqueous zinc electroplating solutions comprising a bath soluble cationic alkylated condensation polymer obtained by alkylation of a polymer prepared by the reaction of from about 0.5 to about 1.0 mol epihalohydrin compound per mol of a heterocyclic compound having a five or six membered ring containing at least two nitrogen atoms, which polymer is then alkylated with about 0.1 to about 0.5 mol per mol of said heterocyclic compound of an alkylating agent corresponding to the formula:

$$[X-R-N(R')_3]^+ X^-$$

Wherein:
R = ethyl or 2-hydroxy propyl,
R' = an alkyl group of 1 to 4 carbons, and
X = Cl, Br or I.

2. The brightener as defined in claim 1 in which the amount of heterocyclic compound reacted with the epihalohydrin compound to form the polymer is in a molar excess relative to said epihalohydrin compound.

3. The brightener as defined in claim 1 in which said epihalohydrin comprises epichlorohydrin.

4. The brightener as defined in claim 1 in which said epihalohydrin is present in an amount of about 0.9 mol and said alkylating agent is present in an amount of about 0.2 mol.

5. The brightener as defined in claim 1 in which said alkylating agent comprises 3-chloro-2-hydroxy-propyl trimethyl ammonium chloride.

6. An aqueous zinc electroplating solution comprising zinc ions and an effective amount of the bath soluble cationic alkylated condensation polymer as claimed in claim 1.

7. A method for electrodepositing a bright zinc plating on a substrate which comprises the steps of electrodepositing zinc from an aqueous zinc plating solution as defined in claim 6.

* * * * *